(12) United States Patent
Angell et al.

(10) Patent No.: US 10,841,155 B2
(45) Date of Patent: Nov. 17, 2020

(54) SYSTEMS AND METHODS FOR MANAGEMENT OF CLOUD COMPUTING RESOURCES FOR INFORMATION SYSTEMS

(71) Applicant: VELOCITY TECHNOLOGY SOLUTIONS, INC., Charlotte, NC (US)

(72) Inventors: Keith Angell, Charlotte, NC (US); Paul Mockenhaupt, Charlotte, NC (US); Sal Jamil, Charlotte, NC (US)

(73) Assignee: Velocity Technology Solutions, Inc., Charlotte, NC (US)

( * ) Notice: Subject to any disclaimer, the term of this patent is extended or adjusted under 35 U.S.C. 154(b) by 155 days.

(21) Appl. No.: 15/454,932

(22) Filed: Mar. 9, 2017

(65) Prior Publication Data

US 2017/0264486 A1 Sep. 14, 2017

Related U.S. Application Data

(60) Provisional application No. 62/306,429, filed on Mar. 10, 2016.

(51) Int. Cl.
*H04L 12/24* (2006.01)
*H04L 12/26* (2006.01)
(Continued)

(52) U.S. Cl.
CPC ...... *H04L 41/0813* (2013.01); *H04L 41/0806* (2013.01); *H04L 41/0896* (2013.01);
(Continued)

(58) Field of Classification Search
CPC ............. H04L 41/0806; H04L 41/0813; H04L 41/0896; H04L 41/5025; H04L 43/0817;
(Continued)

(56) References Cited

U.S. PATENT DOCUMENTS

| 7,757,214 | B1 * | 7/2010 | Palczak | ................. | G06F 9/5083 |
| | | | | | 709/223 |
| 8,738,972 | B1 * | 5/2014 | Bakman | ............... | G06F 11/0712 |
| | | | | | 714/47.1 |

(Continued)

OTHER PUBLICATIONS

International Search Report and Written Opinion of the International Searching Authority, dated May 22, 2017, in International Application No. PCT/US2017/021596, 24 pages.
(Continued)

*Primary Examiner* — George C Neurauter, Jr.
(74) *Attorney, Agent, or Firm* — Dentons US LLP

(57) ABSTRACT

The system and methods described herein provide for dynamic provisioning of computing resources for an enterprise resource planning system. The dynamic provisioning system provisions an original configuration of computing resources upon selection from a client device, and then provides for further dynamic provisioning by evaluating the real-time performance of the ERP system or by analyzing historical performance and consumption information of the ERP system or by using a combination to predict the anticipated stress on the computing resources placed by future performance of the ERP system.

15 Claims, 7 Drawing Sheets

(51) Int. Cl.
*H04L 29/08* (2006.01)
*H04L 29/06* (2006.01)

(52) U.S. Cl.
CPC ...... *H04L 41/5025* (2013.01); *H04L 43/0817* (2013.01); *H04L 43/0876* (2013.01); *H04L 43/16* (2013.01); *H04L 67/10* (2013.01); *H04L 67/42* (2013.01)

(58) Field of Classification Search
CPC ..... H04L 43/0876; H04L 43/16; H04L 67/10; H04L 67/42
See application file for complete search history.

(56) References Cited

U.S. PATENT DOCUMENTS

| | | | |
|---|---|---|---|
| 9,253,253 B1* | 2/2016 | Bhattacharyya | H04L 67/1008 |
| 9,356,883 B1* | 5/2016 | Borthakur | H04L 41/5025 |
| 9,912,570 B2* | 3/2018 | Hartley | H04L 43/16 |
| 9,998,562 B1* | 6/2018 | Peterson | H04L 67/32 |
| 10,491,692 B1* | 11/2019 | Feiguine | H04L 67/16 |
| 10,511,481 B1* | 12/2019 | Castellanos | H04L 41/0883 |
| 10,511,540 B1* | 12/2019 | Norbeck, Jr. | G06F 9/5083 |
| 10,555,145 B1* | 2/2020 | Siddiqui | H04W 4/50 |
| 2002/0169876 A1* | 11/2002 | Curie | G06Q 10/06 709/226 |
| 2005/0131982 A1 | 6/2005 | Yamasaki et al. | |
| 2006/0274722 A1 | 12/2006 | Polan et al. | |
| 2008/0059972 A1* | 3/2008 | Ding | G06F 9/505 718/105 |
| 2008/0228755 A1 | 9/2008 | Haga et al. | |
| 2009/0228883 A1* | 9/2009 | Gebhart | G06F 9/45533 718/1 |
| 2010/0299366 A1* | 11/2010 | Stienhans | G06F 9/5072 707/803 |
| 2011/0016214 A1 | 1/2011 | Jackson | |
| 2012/0054626 A1 | 3/2012 | Odenheimer | |
| 2012/0173709 A1 | 7/2012 | Li et al. | |
| 2013/0111476 A1 | 5/2013 | Medovich | |
| 2013/0138806 A1 | 5/2013 | Gohad et al. | |
| 2014/0122695 A1* | 5/2014 | Kulikov | H04L 41/5054 709/224 |
| 2014/0278808 A1* | 9/2014 | Iyoob | G06Q 30/0206 705/7.35 |
| 2015/0006711 A1 | 1/2015 | Schaad | |
| 2015/0074174 A1 | 3/2015 | Musial et al. | |
| 2015/0286505 A1* | 10/2015 | Liu | G06F 9/5011 718/104 |
| 2015/0341230 A1* | 11/2015 | Dave | H04L 41/5058 705/7.29 |
| 2015/0341240 A1* | 11/2015 | Iyoob | H04L 43/08 709/201 |
| 2016/0019636 A1* | 1/2016 | Adapalli | G06Q 30/0641 705/26.62 |
| 2016/0094483 A1* | 3/2016 | Johnston | H04L 47/827 709/226 |
| 2016/0342443 A1* | 11/2016 | McDermott | G06F 9/5016 |

OTHER PUBLICATIONS

Written Opinion, dated Dec. 6, 2019, issued in corresponding Singapore Application No. 11201807001Y, 6 pages.
Supplemental European Search Report, dated Sep. 20, 2019, issued in corresponding European Application No. 17764107.3, 7 pages.

* cited by examiner

SYSTEMS AND METHODS FOR MANAGEMENT OF CLOUD COMPUTING RESOURCES FOR INFORMATION SYSTEMS

CROSS-REFERENCE TO RELATED APPLICATIONS

This application claims priority to U.S. Provisional Application Ser. No. 62/306,429 filed on Mar. 10, 2016, which is hereby incorporated by reference in its entirety.

TECHNICAL FIELD

The present disclosure relates in general to systems and methods for managing and allocating computing resources to support enterprise-level information on a distributed computer system, and more specifically to systems and methods for dynamic provisioning of computing resources in anticipation of or in response to increased consumption of such resources required to run information systems.

BACKGROUND

Information systems, such as enterprise resource planning (ERP) systems, may include software solutions that integrate information and processes within and across different areas of an organization or across different communicatively-coupled entities, so enterprise-wide information can be viewed and enterprise-wide decisions can be made and implemented. ERP systems are continually engaged in generating, collecting, and processing massive volumes of data as information from users, customers, managers, and other stakeholders. During certain time periods, higher demands are placed on the allocated computing resources for the ERP systems, and these resources are stressed because the allocated resources are not sufficient to meet the sudden spikes in resource consumption, such as increases in transactions around payroll, or increased number of customer orders during seasonal sales. So clients usually purchase more resources than required to support these infrequent demands on the resources. During other time periods, the resources allocated to the ERP systems are under-utilized and thus, the client ends up paying higher costs for unconsumed resources. Technologies for quick provisioning of computing resources in response to changing needs tend to involve manual processes or are very vendor- or technology-specific or limited to certain cloud environments.

SUMMARY

Disclosed herein are systems and methods addressing the shortcomings of the art, and may provide any number of additional advantages, such as increasing efficiency and productivity of the information system, reducing costs, and acquiring a competitive business advantage. The system and methods described herein provide for dynamic provisioning of computing resources for an enterprise resource planning system. The dynamic provisioning system provisions an original configuration of computing resources upon selection from a client device, and then provides for further dynamic provisioning by evaluating the real-time performance of the information system or by analyzing historical performance and consumption information of the information system or by using a combination to predict the anticipated stress on the computing resources placed by future performance of the information system.

Certain embodiments include a method of dynamic provisioning of computing resources for an enterprise resource planning system. The method includes receiving, by a dynamic provisioning system (e.g., a server), from a client device a selection of a first plurality of computing resources for an enterprise resource planning system and stored as a first plurality of records in an resource management database; allocating and deploying, by a dynamic provisioning system, the first plurality of computing resources defining an original configuration for access by the client device; receiving real-time consumption information from the enterprise resource planning system containing the original configuration; determining a provisioning threshold associated with the original configuration and stored as a third plurality of records in the resource management database; determining that the original configuration needs to be modified in response to two or more of the third plurality of records satisfying a preset relationship to two or more of the second plurality of records; allocating a second plurality of resources defining a modified configuration in response to determining that original configuration needs to be modified; and deploying, by a dynamic provisioning system, the modified configuration for access by the client device. The real-time consumption information includes a real-time performance measurement and a real-time capacity measurement and is stored as a second plurality of records in the resource management database. The provisioning threshold includes a predefined performance measurement and a predefined capacity measurement. The predefined performance measurement and the predefined capacity measurement can be determined by analyzing historical performance information and historical consumption information associated with the original configuration. The predefined performance measurement and the predefined capacity measurement can be determined by analyzing a real-time performance measurement and a real-time capacity measurement associated with the original configuration.

The predefined performance measurement can be, without limitation, one or more or any combination of transaction counts, rate of transactions, commit count, average downtimes, maximum downtimes, downtime durations, login attempts, and application response times. The predefined capacity measurement can be one or more of system CPU usage metric, application CPU usage metric, amount of memory utilized, amount of available memory, network resource consumption and availability of infrastructure components. The predefined performance measurement can be one or more of the metrics focused on time and resources consumed in creating new application environments, deploying or redeploying applications, and integrating applications into a new lifecycle phases. Other predefined performance measurements can include network latency, congestion, and quality of service measurements. The predefined capacity measurement can be one or more of measurements of platform and business services available in the resource pool and also infrastructure size, usage, and availability, including but not limited to hardware systems, storage and networking resources. Certain embodiments can include an enterprise resource planning system providing other services, including cloud-based services such as Platform as a Service (PaaS) or Infrastructure as a Service (IaaS). The predefined performance measurements and predefined capacity measurements can be tailored to suit the needs of the client, or can be standard measurements associated with the services provided by the enterprise system.

Certain embodiments include a system for dynamic provisioning of computing resources for an enterprise resource planning system. The system includes a resource management database; one or more processors communicatively coupled to the resource management database; and non-transitory computer-readable medium positioned in communication with the one or more processors and having computer program stored thereon including a set of instructions. This set of instructions when executed by one or more processors cause the one or more processors to perform operations of receiving from a client device a selection of a first plurality of computing resources for an enterprise resource planning system and stored as a first plurality of records in an resource management database; allocating and deploying the first plurality of computing resources defining an original configuration for access by the client device; receiving real-time consumption information from the enterprise resource planning system containing the original configuration; determining a provisioning threshold associated with the original configuration and stored as a third plurality of records in the resource management database; determining that the original configuration needs to be modified in response to two or more of the third plurality of records satisfying a preset relationship to two or more of the second plurality of records; allocating a second plurality of resources defining a modified configuration in response to determining that original configuration needs to be modified; and deploying, by a dynamic provisioning system, the modified configuration for access by the client device.

Numerous other aspects, features and benefits of the present disclosure may be made apparent from the following detailed description taken together with the drawing figures. The systems can include less components, more components, or different components depending on desired analysis goals. It should be further understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale. The emphasis is instead placed upon illustrating the principles of the disclosure. In the figures, reference numerals designate corresponding parts throughout the different views.

DETAILED DESCRIPTION

Figure 1:
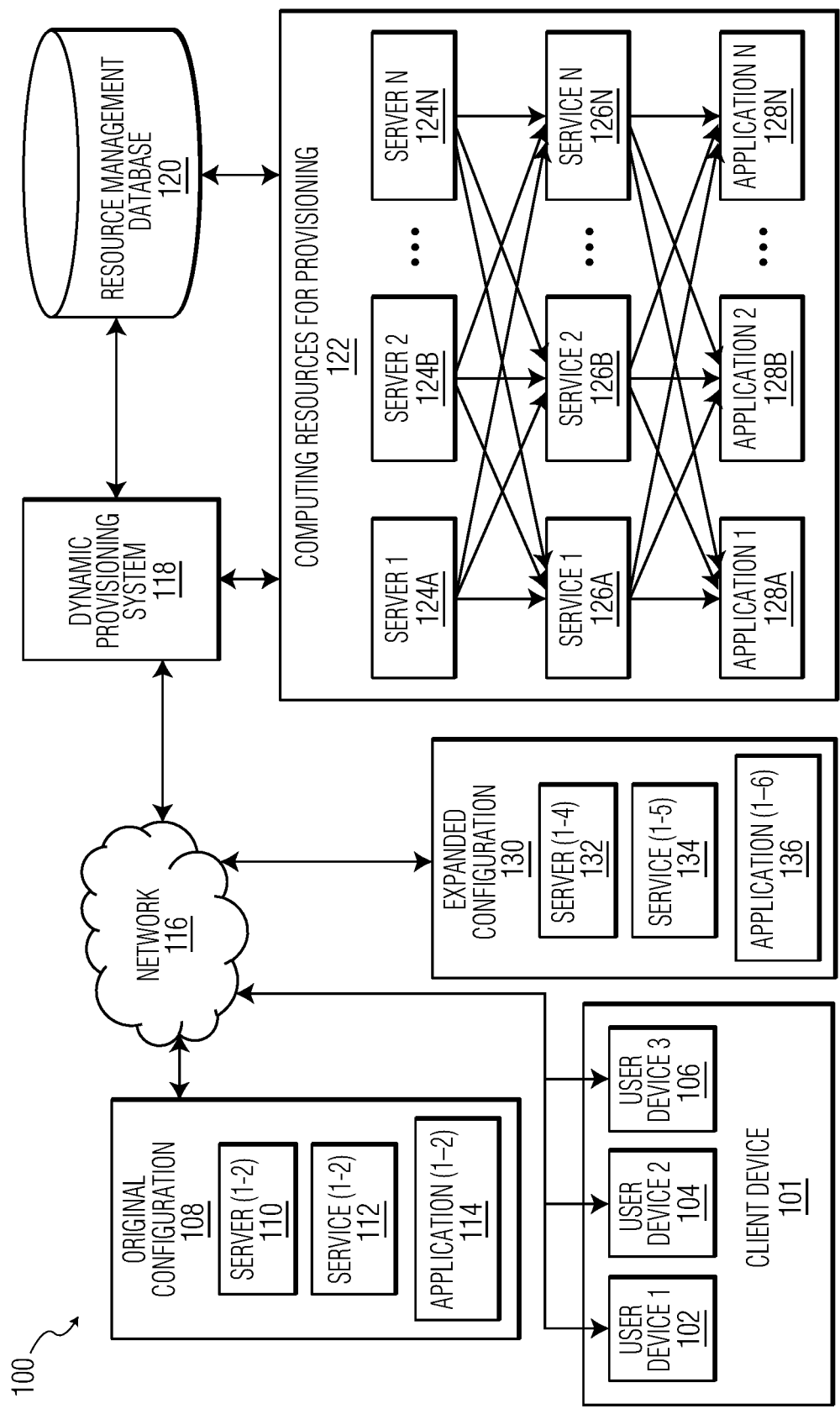
FIG. 1 is a block diagram illustrating a system including a dynamic provisioning system for an ERP system, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

As used here, the following terms may have the following definitions:

A "dynamic provisioning system" refers to one or more software modules that handle data, execute rules, and perform data matching by using appropriate logic, including but not limited to software that allocate and provision computing resources with appropriate systems, data, and software, for enterprise resource planning systems. A dynamic provisioning system dynamically creates a system from an available catalog of system options, and sets them up with appropriate software, for example, such as operating system, device drivers, middleware, and applications, such that the newly provisioned systems are ready to support the demands of the ERP system at the client device.

"Computing resources" refers to networks, systems, servers, storage, applications, appliances, and services in a shared pool that is accessible to the dynamic provisioning system and also information relating to characteristics or attributes relevant to development, deployment or performance of these resources, such as latency, geography, responsiveness, bandwidth, storage capacity, processing speed, processing type, platforms involved, data involved, protocols used, and specific organizational requirements.

Enterprise systems are usually over-provisioned. Enterprise systems are complex, and as such, do not show stress in ways that simple systems do. Therefore, automated expansions and contractions of available computing resources based upon simple infrastructure or platform metrics will be inadequate for most enterprise applications. The dynamic provisioning system measures the stress on resources supporting an ERP by evaluating the internal performance of the enterprise application itself and predicts the anticipated stress on the resources placed by future performance by analyzing historical performance and consumption data about the internal performance of the enterprise application. The real-time analytics is based upon real-time performance data from within the application, while the predictive analytics is based upon historical data of performance from within the application. Either one or both of these analytics are utilized by the dynamic provisioning system to automatically provided scaled configurations of enterprise application components and/or infrastructure.

Certain embodiments include a system for dynamic provisioning of computing resources in an enterprise resource planning system. The system includes a resource management database; one or more processors communicatively coupled to the resource management database; and non-transitory computer-readable medium positioned in communication with the one or more processors and having computer program stored thereon including a set of instructions. These instructions when executed by one or more processors cause the one or more processors to perform operations of receiving from a client device a selection of a first plurality of computing resources and stored as a first plurality of records in an resource management database; allocating and deploying the first plurality of computing resources defining an original configuration for access by the client device; designating a provisioning threshold associated with the original configuration and stored as a second plurality of records in the resource management database; receiving real-time consumption information from the enterprise resource planning system containing the original configuration and stored as a third plurality of records in the resource management database; determining that the original configuration needs to be modified in response to two or more of the third plurality of records satisfying a preset relationship to two or more of the second plurality of records; allocating a second plurality of resources defining a modified configuration in response to determining that original configuration needs to be modified; and deploying, by a dynamic provisioning system, the modified configuration for access by the client device.

FIG. 1 is a block diagram illustrating a system including a dynamic provisioning system for an ERP system, according to an embodiment. Although an example embodiment used throughout the disclosure describes an ERP system, it is intended that any information system can be used. The plurality of steps included in methods described herein may be performed by one or more computing devices such as, for example, the system described in 100. Each of the different components of a dynamic provisioning system 118 may be implemented in any type of computer-based architecture including suitable processor-controlled devices that receive, process, and/or transmit digital data, configured as described above. Examples of devices incorporating one or more suitable processor-controlled devices include smartphones, desktop computers, laptop computers, servers, tablets, PDAs, and specialized computing platforms performing enterprise data processing, rule matching and notification algorithms, and the like.

In certain embodiments, user devices 102, 104, and 106, individually or in combination, comprise the client device 101 that performs one or more transactions in the ERP system and interact with the dynamic provisioning system 118 via network 116. The dynamic provisioning system 118 may include one or more servers, which may be coupled to or include one or more data stores. One or more of the user devices 102, 104, and 106 can be an authorized user device or can be accessed by an authorized user to select a set of computing resources to best service the requirements of the ERP system for the organization. Users can select from lists of prearranged configurations or build their own configuration. The dynamic provisioning system 118 queries the computing resources 122 available for provisioning and evaluates one or more of the servers 124a, 124b, and up to 124n, one or more of the services 126a, 126b, and up to service 126n, and one or more of the applications 128a, 128b, and up to 128n to match the type(s), capacity, and combination of computing resources with the selected configuration from the client device 101. A successful match of computing resources will also include a check of applicable policies for provisioning the computing resources to the client device 101. For example, the selection of computing resources from the client device 101 is checked against the contractual limitations between the client and the provider, and other best-practice limitations for the relationships between the various components of the computing resources being requested. The computing resources 122 available for provisioning may be, without limitation, within a cloud infrastructure, or constructed from multiple cloud computing resources, or a combination of cloud and non-cloud computing resources. Cloud computing resources may comprise an internal cloud, an external cloud, a private cloud, or a public cloud (e.g., commercial cloud) or hybrids of these resources. The cloud computing resources may include, without limitation, an internal private cloud resource, an external private cloud resource, or a secure public cloud resource or combinations thereof. A private cloud may be implemented using a variety of cloud systems including, for example and without limitation, Eucalyptus Systems, VMWare vSphere®, or Microsoft® HyperV. Providers of public clouds may include, for example, Amazon Web Services®, Terremark®, Savvis®, GoGrid®, Microsoft Azure, and Google cloud. The computing resources 122 available for provisioning may include, for example and without limitation, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs).

The dynamic provisioning system 118 deploys this set of resources, known as the original configuration 108 that includes physical and virtual environments, such as package 110 with all or some of servers 1 and 2, package 112 with all or some of services 1 and 2, and package 114 with access to applications 1 and 2. The dynamic provisioning system 118 may be implemented as software that runs on a system (e.g, server) including a processing unit for running related algorithms or computer executable program instructions. The dynamic provisioning system 118 may be implemented using a single-processor system including one processor, or a multi-processor system including any number of suitable processors that may be employed to provide for parallel and/or sequential execution of one or more portions of the techniques described herein. Processes and logic flows described herein may be performed by one or more programmable processors executing one or more computer programs to perform functions by operating on input data and generating corresponding output. Processing unit may include a processor with computer-readable medium, such as a random access memory (RAM) (not shown) coupled to the processor. Examples of processor may include a microprocessor, application specific integrated circuit (ASIC), and field programmable object array (FPOA), among others.

In some embodiments, dynamic provisioning system 118 can be implemented as part of a server, a user computing device and the like. Examples of suitable implementations of the dynamic provisioning system 118 include servers and other types of processor-controlled devices that receive, process, and/or transmit digital data. In an example, dynamic provisioning system 118 performs certain operations that are required for the proper operation of system architecture 100. Suitable dynamic provisioning system 118 performs these operations as a result of central processing unit executing software instructions contained within a computer-readable medium, such as within memory. In one embodiment, the software instructions of the system are read into memory associated with the dynamic provisioning system 118 from another memory location, such as from storage device, or from another computing device via communication interface. In this embodiment, the software instructions contained within memory instruct the dynamic provisioning system 118 to perform processes described above. Alternatively, hardwired circuitry may be used in place of or in combination with software instructions to implement the processes described herein. Thus, implementations described herein are not limited to any specific combinations of hardware circuitry and software.

The dynamic provisioning system 118 is communicatively coupled to the resource management database 120. In one or more embodiments, resource management database 120 contains the data from the ERP systems, including but not limited to data from accounting and finance, human resources, manufacturing, inventory control, sales and marketing, purchasing, warehouses, shipping, and other logistics groups, and also data from the client systems, including data related to the performance and capacity measurements corresponding to each of the client devices 101, or to the individual user devices 102, 104, and 106.

The resource management database 120 may be configured as a combination of external sources and internal database, and is implemented in a fashion that provide functions of fetching, indexing, and storing data. In these embodiments, resource management database 120 provides aforementioned data and other stored data and files to one or more software modules within dynamic provisioning system 100 for further analysis. Examples of data received from external sources include inventory management, sales, customer interaction, and financial records. The resource management database 120 may be implemented through database management systems (DBMS), such as, without limitation, MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that may organize collections of data. In these embodiments, resource management database 120 can be implemented using application protocols for accessing and maintaining distributed directory information services or data feeds such as, for example, Lightweight Directory Access Control (LDAP), among others. Data stored in fields of the databases can be updated as needed, for example, by a user with administrative access to the database to add new data to the libraries in the database as they become supported. It will be appreciated by those having skill in the art that data described herein as being stored in the databases can also be stored or maintained in non-transitory memory and accessed among subroutines, functions, modules, objects, program products, or processes, for example, according to objects and/or variables of such subroutines, functions, modules, objects, program products or processes. Any of the fields of the records, tables, libraries, and so on of the database can be multi-dimensional structures resembling an array or matrix and can include values or references to other fields, records, tables, or libraries. Any of the foregoing fields can contain actual values or a link, a join, a reference, or a pointer to other local or remote sources for such values. External sources can be, for example, a single database, multiple databases, or a virtual database, including data from multiple sources, for example, servers on the World Wide Web.

The electronic communications network 116 may comprise any communication architecture. For example and without limitation, inclusive of devices and software, which facilitates communication between transmitter and receiver residing in one or more computing devices that form the system 100. It should also be obvious to one skilled in the art that the network components may be implemented in dedicated processing equipment, or alternatively in a cloud processing network. The network 116 may be the intranets, local area networks (LAN), cloud networks, virtual private networks (VPN), wireless area networks (WAN), and the internet, or any other network that enables servers and user devices to interact with one another. Non-limiting examples of devices comprising the network may include routers, switches, hubs, firewalls, proxy servers, telecommunications trunks, and the like. Accordingly, the electronic communications network can be implemented, in whole or in part, over a wireless or a wired communications network or combination of both. In addition, according to various exemplary embodiments of the present invention, the wireless communications network can be implemented over any of various wireless communication technologies, for example: code division multiplexed access ("CDMA"), global system for mobile communications ("GSM"), and wireless local area network such as WiFi, World Interoperability for Microwave Access ("WiMAX"), or Bluetooth®.

The dynamic provisioning system 118 generates user interfaces on computing devices, including user devices 102, 104, and 106. Such devices are communicatively coupled to and in bi-directional communication with other devices, databases, and components of the dynamic provisioning system 100. User devices 102, 104, and 106 can be a laptop computer or a desktop computer, or a mobile computing device such as a smart phone, a cell phone, a tablet, a personal digital assistant (PDA), a mobile computer with a smart phone client, or any other data access-enabled device. The dynamic provisioning system 118 utilizes the user interfaces to request, collect, and present information from and to one or more of the users. The users interact with the user interface via an input/output (I/O) device such as, a touch screen or a mouse, a keyboard and/or a keypad working in concert with a display, and others. In some embodiments, data processing modules of the dynamic provisioning system 118 are further configured to automatically retrieve information requested by one or more computing devices 102, 104, and 106 or one or more software modules. In certain embodiments this information is obtained from the operation of one or more software modules within the ERP system. The dynamic provisioning system 118 is communicatively coupled to one or more physical and virtual environments, including but not limited to those comprising server package 110, operating service package 112, and application package 114 of the original configuration 108. In one or more embodiments, the dynamic provisioning system 118 can interact with these services, applications, and databases through one or more application programming interfaces ("API"), an RSS feed, or some other structured format. The API can be any Representational State Transfer Application Programming Interface (REST API) that controls and manages one or more APIs.

In certain embodiments, when the dynamic provisioning system 118 receives a request from a client device 101, it creates the appropriate number of virtual machines and allocates resources to support them. This process may happen in several ways. For example, with advance provisioning, the client may contract with the provider for services and is charged a flat fee or billed on a monthly basis, according to a contractual arrangement between the parties. In dynamic provisioning, the provider allocates more resources when needed by the client and decommissions the resources when they are not needed by the client. The client pays only for resources that are actually utilized by the client systems.

The dynamic provisioning system 118 may then determine a provisioning threshold associated with the original configuration and store it as a plurality of records in the resource management database 120. In certain embodiments, as shown in FIG. 1, the provisioning threshold may be an expansion provisioning threshold, and include the upper range or upper limits of performance and capacity measurements that would trigger provisioning of more computing resources to the ERP system. This provisioning threshold may establish the upper limits of one or more system CPU usage metrics, application CPU usage metrics, memory consumption and availability metrics. The provisioning threshold may establish the upper limits of network measurements such as network bytes per second, application measurements such as transaction counts, rates, and commit count, average downtimes, maximum downtimes, and application response times. The provisioning threshold may also establish the upper limits of infrastructure component measurements such as response time, latency, availability of the components, other performance and capacity measurements. The provisioning threshold may be determined by using raw data, cleansed data and/or enriched data from within the ERP systems and across all information systems.

The dynamic provisioning system 118 receives real-time consumption information from the enterprise resource planning system containing the original configuration 108 and stores it as a plurality of records in the resource management database 120. The real-time consumption information includes real-time performance and capacity measurements of the system, and is stored as a plurality of records in the resource management database 120. The real-time consumption information includes one or more of real-time system CPU usage metrics, real-time application CPU usage metrics, real-time memory consumption and availability metrics, real-time network measurements such as network bytes per second, real-time application measurements such as transaction counts and rates, and commit count, average downtimes, and maximum downtimes, and application response times, infrastructure component measurements such as response time, latency, and availability of the components, and other real-time performance and capacity measurements. The real-time consumption information can be determined by using raw data or cleansed data or enriched data from within the ERP systems and across all information systems.

The dynamic provisioning system 118 then compares two or more of the plurality of records associated with the real-time consumption information to two or more of the plurality of records associated with the provisioning threshold to evaluate if a preset relationship is satisfied. Examples of preset relationships, without limitations, include determining if the real-time system CPU usage equals or exceeds 75% of the system CPU usage set as a provisioning threshold, or if the transaction rate is greater than a thousand transactions per second. If the preset relationship is satisfied, the dynamic provisioning system determines that the original configuration 108 needs to be expanded to a more suitable configuration to service the needs of the ERP system. The dynamic provisioning system 118 queries the computing resources 122 available for provisioning and evaluates the servers 124a, 124b, and up to 124n, the services 126a, 126b, and up to service 126n, and the applications 128a, 128b, and up to 128n to match the type(s), capacity, and combination of computing resources required to meet the needs of the client device when the real-time consumption information exceeds the provisioning threshold. A successful match of computing resources will also include a check of applicable policies for provisioning the computing resources to the client device 101. For example, the selection of computing resources from the client device 101 is checked against the contractual limitations between the client and the provider, and other best-practice limitations for the relationships between the various components of the computing resources being assembled under the expanded configuration 130.

The plurality of resources presented as the expanded configuration 130 includes physical and virtual environments with more computing resources, such as a server package 132 with all or some of servers 1, 2, 3, and 4, a service package 134 with all or some of services 1, 2, 3, 4, and 5, and an applications package 136 with access to applications 1, 2, 3, 4, 5, and 6. In certain embodiments, the dynamic provisioning system 118 evaluates these resources for optimal delivery of capabilities to service the impending or future needs of the ERP system. The expanded configuration 130 includes one or more servers, applications, and services required by the client device to service the impending or future needs of the enterprise resource planning system. The expanded configuration 130 also includes information relating to characteristics or attributes relevant to development, deployment or performance of these resources. The characteristics or attributes may include latency, geography, responsiveness, bandwidth, storage capacity, processing speed, processing type, platforms involved, data involved, protocols used, and specific organizational requirements. The dynamic provisioning system 118 may deploy the expanded configuration for access by the client device. Deployment of the expanded configuration 118 may involve all tasks required to assemble, validate, and make available the plurality of resources constituting the modified configuration 130.

The provisioning threshold may be static or dynamic. The provisioning threshold may be determined based on the historical consumption information associated with the enterprise resource planning system associated with the client devices, or the real-time consumption information obtained from the enterprise resource planning system associated with the client devices, or combinations of both types of information. The dynamic provisioning system can be configured to receive data to and from other organizational systems that are communicatively coupled to the ERP systems, including but not limited to web order systems, supply chain systems, or customer relationship management systems. The historical consumption information and the real-time consumption information can be raw data or cleansed data or enriched data from within the ERP systems and across all information systems. The provisioning threshold includes a predefined performance measurement and a predefined capacity measurement. The predefined performance measurement and the predefined capacity measurement can be determined by analyzing historical performance information and historical consumption information associated with the original configuration. The predefined performance measurement and the predefined capacity measurement can be determined by analyzing a real-time performance measurement and a real-time capacity measurement associated with the original configuration.

The predefined performance measurement may be without limitation transaction counts, rate of transactions, commit counts, average downtimes, maximum downtimes, downtime durations, login attempts, and/or application response times. The predefined capacity measurement may be system CPU usage metrics, application CPU usage metrics, amount of memory utilized, amount of available memory, network resource consumption and/or availability of infrastructure components. The predefined performance measurement can be one or more of the metrics focused on time and resources consumed in creating new application environments, deploying or redeploying applications, and integrating applications into new lifecycle phases. Other predefined performance measurements may include network latency, congestion, and/or quality of service measurements. The predefined capacity measurement may include measurements of platform and business services available in the resource pool and also infrastructure size, usage, and availability, including but not limited to hardware servers, storage and networking resources. Certain embodiments may include an enterprise resource planning system providing other services, including cloud-based services such as Platform as a Service (PaaS) or Infrastructure as a Service (IaaS). The predefined performance measurements and predefined capacity measurements may be tailored to suit the needs of the client, or may be standard measurements associated with the services provided by the enterprise system.

The provisioning threshold can be reactive in nature. For example, the dynamic provisioning system may detect unexpectedly large number of transactions, which is much higher than the measurements provided as part of the provisioning threshold, so it provisions additional hardware and software. The provisioning threshold may be determined by predictive analytics. For example, dynamic provisioning system 118 may recognize certain patterns of use by analyzing historical consumption information. Using these patterns, the dynamic provisioning system 118 may present predictive scaling options to the user interfaces on the client devices. Examples of these patterns that have been identified in an ERP system, include without limitation, payroll runs, benefit open enrollment periods, or paycheck stub self-service. So at time periods ahead of the expanded stress on the computing resources, the dynamic provisioning system 118 may provide expanded configuration of computing resources to address the needs of the system. The dynamic provisioning system 118 may also send information to the resource management database 120 for future analytics.

Figure 2:
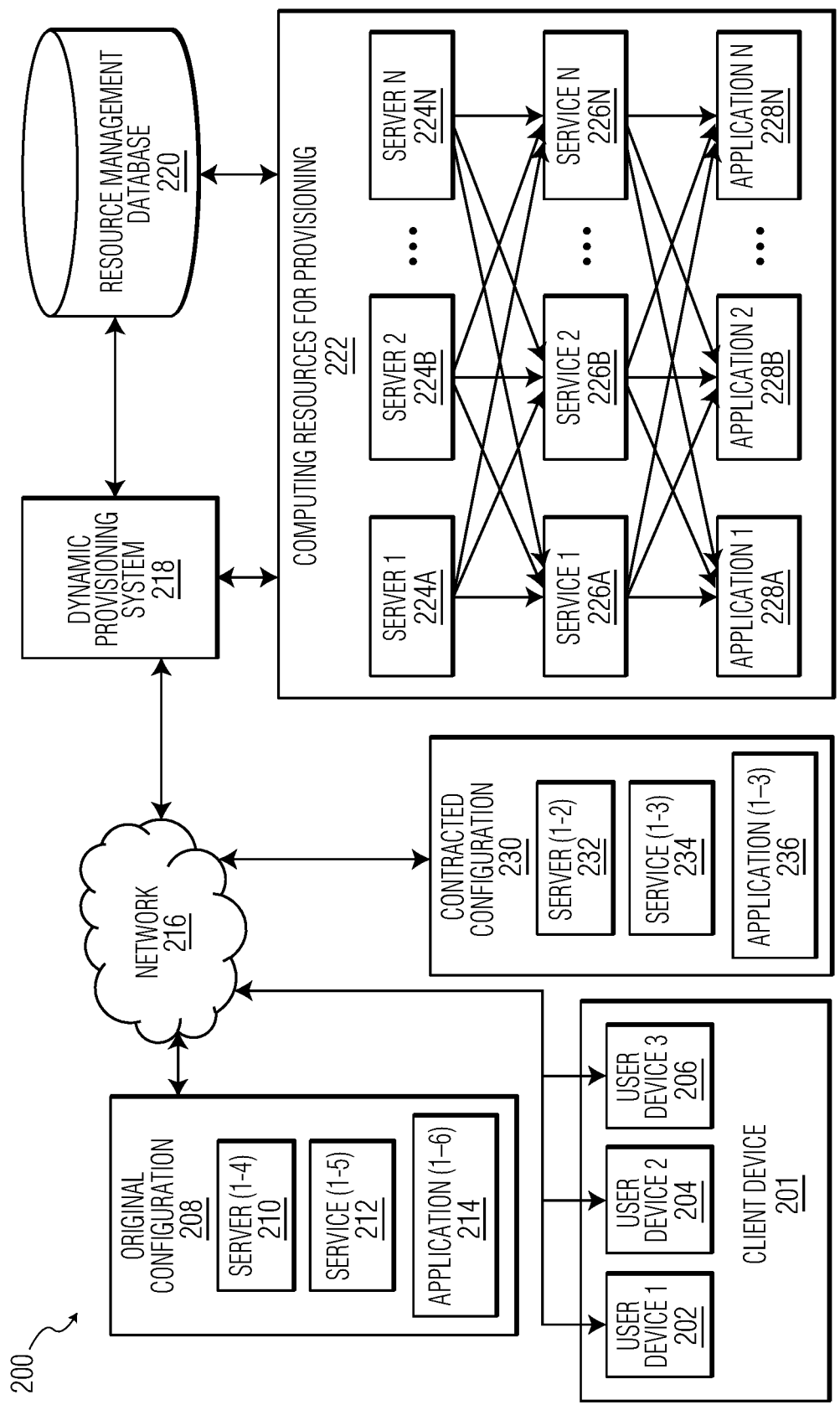
FIG. 2 is a block diagram illustrating another system including a dynamic provisioning system for an ERP system, according to an exemplary embodiment.

FIG. 2 is a block diagram illustrating a system including a dynamic provisioning system for an ERP system, according to an embodiment. The plurality of steps included in methods described herein may be performed by one or more computing devices such as, for example, the system described in 200. Each of the different components of dynamic provisioning system 200 may be implemented in any type of computer-based architecture including suitable processor-controlled devices that receive, process, and/or transmit digital data, configured as described above. In certain embodiments, user devices 202, 204, and 206, individually or in combination, comprise the client device 201 that performs one or more transactions in the ERP system and interact with the dynamic provisioning system 218 via network 216. One or more of the user devices 202, 204, and 206 can be an authorized user device or can be accessed by an authorized user to select a set of computing resources to best service the requirements of the ERP system for the organization. Users can select from lists of prearranged configurations or build their own configuration. The dynamic provisioning system 218 queries the computing resources 222 available for provisioning and evaluates one or more of the servers 224a, 224b, and up to 224n, one or more of the services 226a, 226b, and up to service 226n, and one or more of the applications 228a, 228b, and up to 228n to match the type(s), capacity, and combination of computing resources with the selected configuration from the client device 201. A successful match of computing resources will also include a check of applicable policies for provisioning the computing resources to the client device 201. The computing resources 222 available for provisioning may be within a cloud infrastructure, or constructed from multiple cloud computing resources, or a combination of cloud and non-cloud computing resources.

The dynamic provisioning system 218 deploys this set of resources, known as the original configuration 208 that includes physical and virtual environments, such as a server package 210 with all or some of servers 1, 2, 3, and 4, a service package 212 with all or some of services 1, 2, 3, 4, and 5, and an applications package 214 with access to applications 1, 2, 3, 4, 5, and 6. The dynamic provisioning system 218 is communicatively coupled to the resource management database 220. In one or more embodiments, resource management database 220 contains the data from the ERP systems, including but not limited to data from accounting and finance, human resources, manufacturing, inventory control, sales and marketing, purchasing, warehouses, shipping, and other logistics groups, and also data from the client systems, including data related to the performance and capacity measurements corresponding to each of the client devices 201, or to the individual user devices 202, 204, and 206.

The resource management database 220 may be configured as a combination of external sources and internal database, and is implemented as relational databases that provide functions of fetching, indexing, and storing data. The dynamic provisioning system 218 generates user interfaces on computing devices, including user devices 202, 204, and 206. Such devices are communicatively coupled to and in bi-directional communication with other devices, databases, and components of the dynamic provisioning system 200.

In certain embodiments, when the dynamic provisioning system 218 receives a request from a client device 201, it creates the appropriate number of virtual machines and allocates resources to support them. This process can happen in several ways. For example, with advance provisioning, the client contracts with the provider for services and is charged a flat fee or is billed on a monthly basis, according to a contractual arrangement between the parties. In dynamic provisioning, the provider allocates more resources when needed by the client and decommissions the resources when they are not needed by the client. The client pays only for resources that are actually utilized by the client systems.

The dynamic provisioning system 218 then determines a provisioning threshold associated with the original configuration and stores it as a plurality of records in the resource management database 220. In certain embodiments, as shown in FIG. 2, the provisioning threshold is a contraction provisioning threshold, and includes the lower range or lower limits of performance and capacity measurements that would trigger provisioning of fewer computing resources to the ERP system. This provisioning threshold establishes the lower limits of one or more of system CPU usage metrics, application CPU usage metrics, memory consumption and availability metrics, network measurements such as network bytes per second, application measurements such as transaction counts and rates, and commit count, average downtimes, and maximum downtimes, and application response times, infrastructure component measurements such as response time, latency, and availability of the components, and other performance and capacity measurements. The provisioning threshold can be determined by using raw data or cleansed data or enriched data from within the ERP systems and across all information systems.

The dynamic provisioning system 218 receives real-time consumption information from the enterprise resource planning system containing the original configuration 208 and stores it as a plurality of records in the resource management database 220. The real-time consumption information includes real-time performance and capacity measurements of the system. The dynamic provisioning system 218 then compares two or more of the plurality of records associated with the real-time consumption information to two or more of the second plurality of records associated with the provisioning threshold to evaluate if a preset relationship is satisfied. Examples of preset relationships, without limitations, include determining if the real-time system CPU usage equals or is less than 25% of the system CPU usage set as a provisioning threshold, or if the transaction rate is less than a hundred transactions per second. If the preset relationship is satisfied, the dynamic provisioning server determines that the original configuration 208 needs to be contracted to a more suitable configuration to service the needs of the ERP system. The dynamic provisioning system 218 queries the computing resources 222 available for provisioning and evaluates the servers 224a, 224b, and up to 224n, the services 226a, 226b, and up to service 226n, and the applications 228a, 228b, and up to 228n to match the type(s), capacity, and combination of computing resources required to meet the needs of the client device when the real-time consumption information is less than the provisioning threshold. A successful match of computing resources will also include a check of applicable policies for provisioning the computing resources to the client device 201. For example, the selection of computing resources from the client device 201 is checked against the contractual limitations between the client and the provider, and other best-practice limitations for the relationships between the various components of the computing resources being assembled under the expanded configuration 230.

The plurality of resources presented as the contracted configuration 230 includes physical and virtual environments with fewer computing resources, such as a server package 232 with all or some of servers 1 and 2, a service package 234 with all or some of services 1, 2, and 3, and an applications package 236 with access to applications 1, 2, and 3. The contracted configuration 230 includes one or more servers, applications, and services required by the client device to service the impending or future needs of the enterprise resource planning system, and also information relating to characteristics or attributes relevant to development, deployment or performance of these resources, such as latency, geography, responsiveness, bandwidth, storage capacity, processing speed, processing type, platforms involved, data involved, protocols used, and specific organizational requirements. The dynamic provisioning system 218 deploys the contracted configuration 230 for access by the client device. Deployment of the contracted configuration 230 involves all tasks required to assemble, validate, and make available the plurality of resources constituting the contracted configuration 230.

The contraction provisioning threshold can be static or dynamic. This provisioning threshold can be determined based on the historical consumption information associated with the enterprise resource planning system associated with the client devices, or the real-time consumption information obtained from the enterprise resource planning system associated with the client devices, or combinations of both types of information. The dynamic provisioning system can be configured to receive data to and from other organizational systems that are communicatively coupled to the ERP systems, including but not limited to web order systems, supply chain systems, or customer relationship management systems. The historical consumption information and the real-time consumption information can be raw data or cleansed data or enriched data from within the ERP systems and across all information systems.

The contraction provisioning threshold can be reactive in nature. For example, the dynamic provisioning system detects unexpectedly less number of transactions, which is far fewer than the measurements provided as part of the provisioning threshold, so it provisions fewer hardware and software resources. The provisioning threshold can be determined by predictive analytics. For example, dynamic provisioning system 218 recognizes certain patterns of use by analyzing historical consumption information. Using these patterns, the dynamic provisioning system 218 presents predictive scaling options to the user interfaces on the client device, whereby fewer computing resources are consumed. Examples of these patterns that have been identified in an ERP system, include without limitation, holiday schedules or middle of financial quarters. So at time periods ahead of these decreased stress periods on the computing resources, the dynamic provisioning system 218 provides contracted configuration of computing resources to address the needs of the system.

Figure 3:
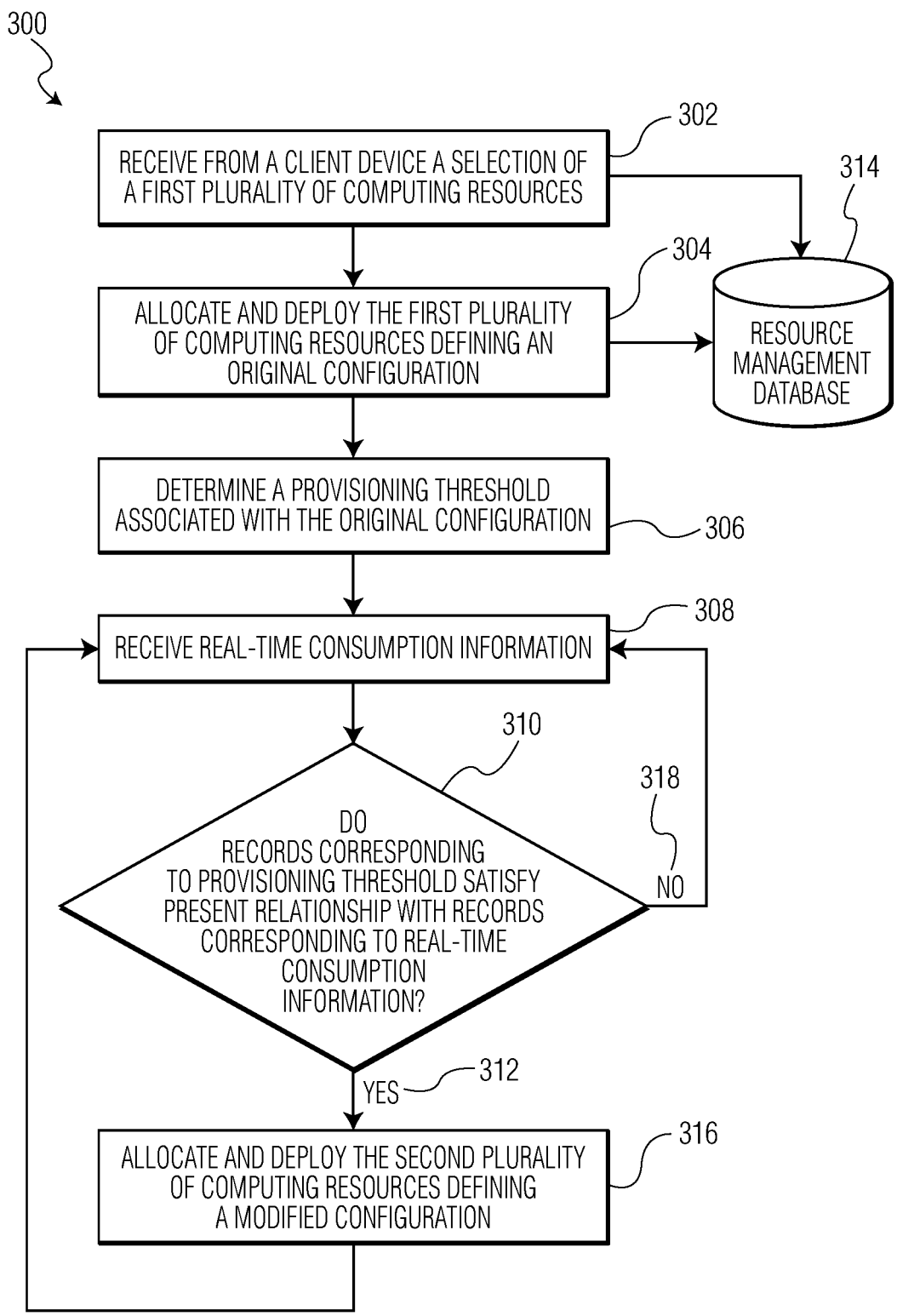
FIG. 3 is a flowchart illustrating a method including a dynamic provisioning system for an ERP system, according to an exemplary embodiment.

Certain embodiments may include a method for dynamic provisioning of computing resources in an enterprise resource planning system. FIG. 3 is a flowchart illustrating a method including a dynamic provisioning system for an ERP system, according to an exemplary embodiment. The method may include receiving in step 302, by a dynamic provisioning system, from a client device a selection of a first plurality of resources and stored as a first plurality of records in a resource management database 314. The first plurality of resources may include one or more servers, applications, and services required by the client device to operate an enterprise resource planning system, and also information relating to characteristics or attributes relevant to development, deployment or performance of these resources, such as latency, geography, responsiveness, bandwidth, storage capacity, processing speed, processing type, platforms involved, data involved, protocols used, and specific organizational requirements. The dynamic provisioning system then allocates and deploys in step 304 the first plurality of computing resources defining an original configuration for access by the client device.

A provisioning threshold associated with the original configuration may be determined in step 306 by the dynamic provisioning system and stored as a plurality of records in the resource management database 314. In certain embodiments, as shown in FIG. 1, the provisioning threshold may be an expansion provisioning threshold that includes the upper range or upper limits of performance and capacity measurements that would trigger provisioning of more computing resources to the ERP system. In certain embodiments, as shown in FIG. 2, the provisioning threshold may be a contraction provisioning threshold including the lower range or lower limits of performance and capacity measurements that would trigger provisioning of fewer computing resources to the ERP system. In other embodiments, the provisioning threshold can be a combination of both applied to different computing resources. For example, the provisioning threshold may include the upper range or upper limits of performance and capacity measurements of the processing resources, along with the lower range or lower limits of performance and capacity measurements of the application resources. In this instance, the dynamic provisioning system may present a modified configuration to the client device that expands the processing resources and decreases the application resources.

Real-time consumption information from the enterprise resource planning system containing the original configuration is received in step 308 by the dynamic provisioning system and stored as a plurality of records in the resource management database 314. The real-time consumption information may include real-time performance and capacity measurements of the system. Two or more of the plurality of records associated with the real-time consumption information is compared in step 310 to two or more of the second plurality of records associated with the provisioning threshold to evaluate whether a preset relationship is satisfied. Examples of preset relationships including a combination of expansion and contraction provisioning thresholds include, determining if the real-time system CPU usage equals or is greater than 75% of the system CPU usage set as a provisioning threshold, and/or if the transaction rate is more than a thousand transactions per second and the number of application resources consumed is three. In this instance, if the preset relationship is satisfied 312, the dynamic provisioning system may query and evaluate the computing resources available for provisioning. The computer resources may include, for example, servers, services, and applications to match the type(s), capacity, and combination of computing resources required to meet the needs of the client device. Upon a successful match of computing resources, a second plurality of resources constituting a modified configuration is assembled, allocated, and deployed in step 316 for access by the client device. The plurality of resources presented as the modified configuration in the example described above will involve certain expanded resources and certain contracted resources such as more servers but fewer applications. The modified configuration includes one or more servers, applications, and services required by the client device to service the impending or future needs of the enterprise resource planning system, and also information relating to characteristics or attributes relevant to development, deployment or performance of these resources, such as latency, geography, responsiveness, bandwidth, storage capacity, processing speed, processing type, platforms involved, data involved, protocols used, and specific organizational requirements. If the preset relationship is not satisfied 318, the dynamic provisioning system makes no changes to the original configuration and continues to monitor real-time consumption. Deployment of the modified configuration involves all tasks required to assemble, validate, and make available the plurality of resources constituting the contracted configuration.

Example 1

In an exemplary dynamic provisioning system, users log into web interfaces presented by the dynamic provisioning system and select a product from a standard product catalog presented to the users. An example might be a medium-sized information system for up to 50 named users. Users are also presented with additional ancillary applications for selection on the electronic interfaces, such as computing resources for payroll tax systems or A/P invoice scanning. The dynamic provisioning system then presents user interfaces that will present details on the destination of this new system, such as customized data centers by the service provider, AWS (Amazon), Microsoft Azure, or even the user's internal data center. When all selections have been completed, the dynamic provisioning system retrieves computing resource packages corresponding to the user selections from the product catalog. These packages delineate what needs to be done in order accomplish the provisioning of the infrastructure and then the installation of the selected software. These packages include the definitions of servers (virtual), networking, security, zone availability, load balancing, storage, etc. for the infrastructure and then the software and configurations needed for the applications once the infrastructure is complete. Using a combination of proprietary and open-source software, these packages now guide the dynamic provisioning system as it invokes APIs on the selected destination data center to send its instructions. A catalog of standard products from which the user can make selections regarding the desired or required computing resources is made available on the user devices. This product catalog and automation allow users the ability to create and recreate 100% consistent systems (i.e. create duplicate of production for training purposes). These catalogs and selections can be part of service level agreements. The dynamic provisioning system is able to work with virtually any data center—be that private or public, and also allows user devices to be a single point of system management for systems that are in heterogeneous clouds. Customer billing is integrated and automatic as part of the features of the dynamic provisioning system. Computing resources can be easily decommissioned when the user devices no longer want or need such resources, such as a training duplicate of production.

Example 2

One size does not fit all clients ERP needs. The type of business, number of users, size of databases, number of transactions, complexities of batch requirements, seasonality of business, etc. all affect finding the right size for the different pieces of the ERP system. The ERP systems must also be appropriately sized, taking their "peak usage" periods into consideration. For example, "peak usage" periods for customers may include the end of month closings, holiday shopping seasons, annual benefits enrollment, semi-monthly payrolls (employees checking pay stubs), etc. Traditionally, systems are sized to meet this peak usage plus some additional headroom for safety. This is less than optimal as potentially costly resources can be idle for extended periods of time.

Figure 4:
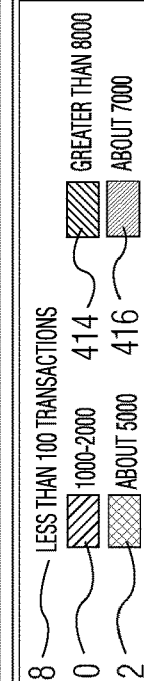
FIG. 4 is an exemplary transaction heat map showing transaction patterns over a given time period, according to an embodiment.

FIG. 4 is a transaction heat map 400 developed to recognize patterns of high usage of certain computing resources for a client that shows the number of transactions occurring over 24 hours for 31 days visible on a computer screen via a user interface. Dates are shown in row 402, while hourly intervals are shown in column 404, with the total transactions occurring in a 24 hour interval shown in row 406. The transaction heat map 400 may include highlighting of various types. Different numbers may be marked in visually distinct manners. For example, different ranges of numbers may be colored differently. Similar or ascending color patterns may be used for contiguous/continuous sections. For example a darker orange may be used for a 200-300 range, and a lighter orange for a 100-200 range. As marked, some of the different ranges are filled with patterns such as dots, left-jagged lines, right-jagged lines, criss-cross etc. Any pattern or style (such as color) may be used for any sequence or collection of numbers/data. This transaction heat map 400 shows how the majority of hours in a month are mostly idle as shown by less than a 100 transactions (fields with no highlighting such as 408). Certain periods show increases in frequency, such as about 1000-2000 transactions between 7:00 AM to 4:00 PM as shown by fields with left angled hatching (also may be blue, for example) 410, or about 5000 transactions as shown by fields with crisscross hatching (also may be green, for example) 412, or about 7000 transactions shown by fields with a dense left angled hatching (also may be orange, for example) 416, or greater than 8000 transactions as shown by fields with right angled hatching (also may be red, for example) 414. Some public clouds may provide facility to auto-expand and contract based upon infrastructure metrics such as CPU utilization, Memory Utilization, Network Usage, etc. An example might be an Apache Web Server (AWS) that normally receives several thousands of hits per day. If this website were to go viral and start receiving thousands of hits per minute, the AWS would recognize that the CPU and Memory are beyond stressed, and the AWS could automatically provision one or more additional copies of this web server, thus lightening the load. When the viral nature diminishes, the AWS could automatically remove one or more of these copies. But this simple scaling based on a few infrastructure metrics are not sufficient for dynamic provisioning of ERP systems. Scaling of computing resources dependent on the needs of the ERP system at the client device is significantly more complex in multi-tier enterprise applications. Adding an additional database resource for storing web-based orders adds great complexity, making simple scaling almost impossible for enterprise applications. Simple scaling utilizes traditional infrastructure metrics such as CPU Usage or Memory Consumption. Enterprise applications, due to their inherent complexity, are usually in need of expansion well before these basic infrastructure metrics show system stress.

Dynamic provisioning systems as described herein receive and analyze metadata associated with the transactions or software operations in the enterprise resource planning system. The dynamic provisioning system collects, processes, and stores information such as transaction usage, batch resource consumption, login attempts and other monitoring metrics. The dynamic provisioning system works with other analytic frameworks to provide automatic expansion and contraction based on actual data coming from inside the enterprise application itself, not just the infrastructure metrics. These expansion and contraction requests are made through APIs provided by the dynamic provisioning system. These expansion and contraction provisioning of computing resources can be reactive in nature, i.e. when an unexpectedly large number of transactions occur in conjunction with some significant batch jobs. When certain components of a dynamic provisioning system receive this transaction metadata in conjunction with base metric data, provisioning thresholds are triggered, and the dynamic provisioning system acts accordingly to provide more computing resources. These expansion and contraction provisioning of computing resources can also be deployed predictively. The dynamic provisioning system recognizes certain patterns of use and develops predictive provisioning thresholds that automatically trigger provisioning requests. Examples of these patterns include payroll runs, benefit open enrollment periods, paycheck stub self-service, etc. Based on the predictive provisioning models, provisioning is initiated ahead of stresses or slumps in the system.

Figure 5:
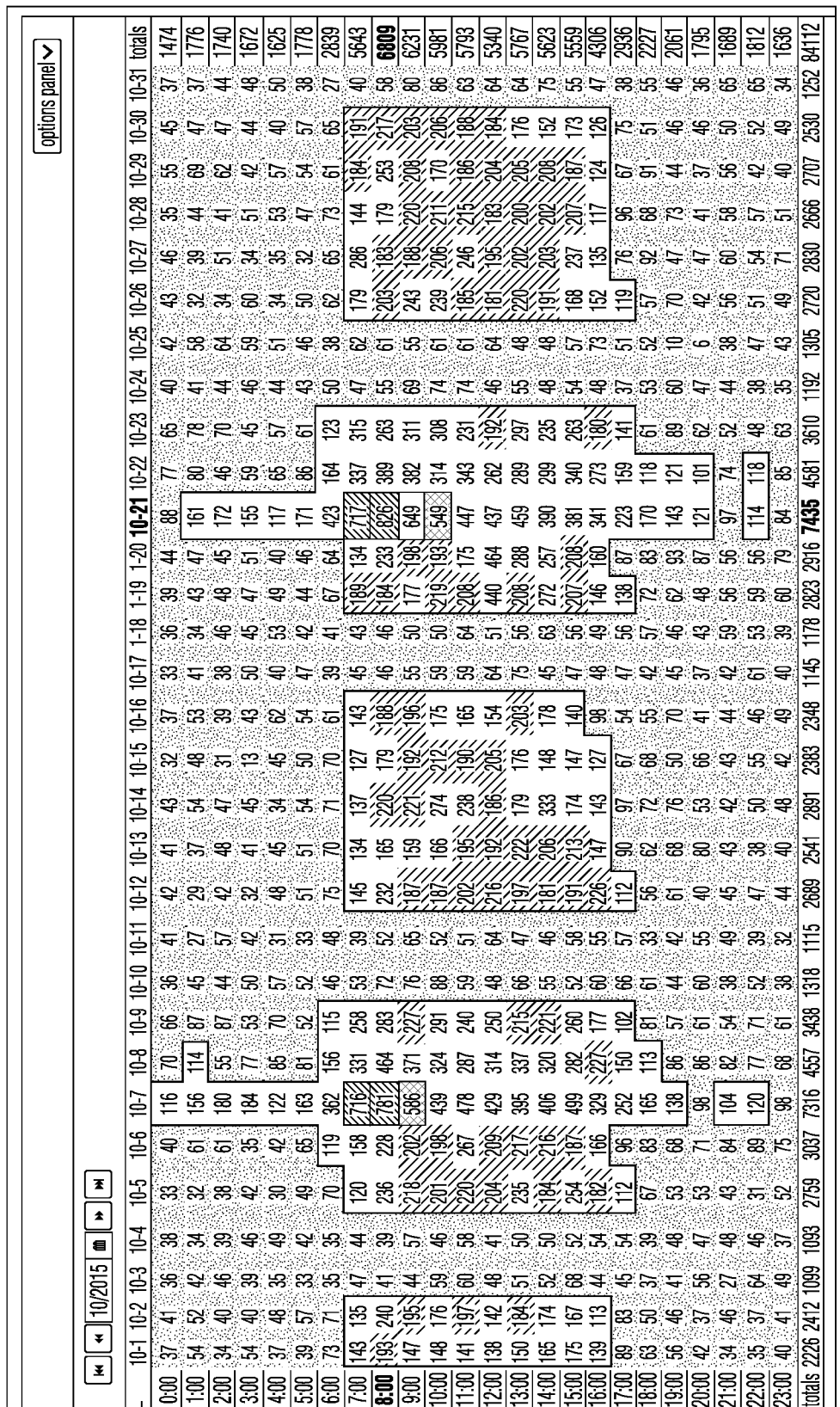
FIG. 5 is an exemplary login heat map showing login patterns over a given time period, according to an embodiment.

FIG. 5 is an exemplary login transaction heat map 500 developed to recognize patterns of high usage of certain computing resources for a client that shows login patterns occurring over 24 hours for 31 days, according to an exemplary embodiment. Dates are shown in row 502, while hourly intervals are shown in column 504, with the total transactions occurring in a 24 hour interval shown in row 506. The transaction heat map 500 may include highlighting of various types. Different numbers may be marked in visually distinct manners. For example, different ranges of numbers may be colored differently. Similar or ascending color patterns may be used for contiguous/continuous sections. For example a light blue may be used for a 0-100 range, and a light green for a 100-250 range. As marked, some of the different ranges are filled with patterns such as dots, left-jagged lines, right-jagged lines, crisscross, etc. Any pattern or style (such as color) may be used for any sequence or collection of numbers/data. This transaction heat map 500 shows how the majority of hours in a month are mostly idle as shown by less than 100 logins (fields with dotted pattern, also may be light blue, for example such as 508). Certain periods show increases in frequency, such as about 200 logins between 7:00 AM to 4:00 PM as shown by fields with left-jagged lines (also may be blue, for example) 510, or about 500 logins as shown by fields with crisscross hatching (also may be yellow, for example) 512, or greater than 700 logins as shown by fields with right angled hatching (also may be red, for example) 514. Analysis of the pattern reveals that employees login every two weeks around 7:00 AM-9:00 AM to check their pay stubs. Depending on the stress of the different computing resources of the system, the dynamic provisioning system anticipates this rise in logins around the specific times, and provisions computing resources appropriately.

Figure 6:
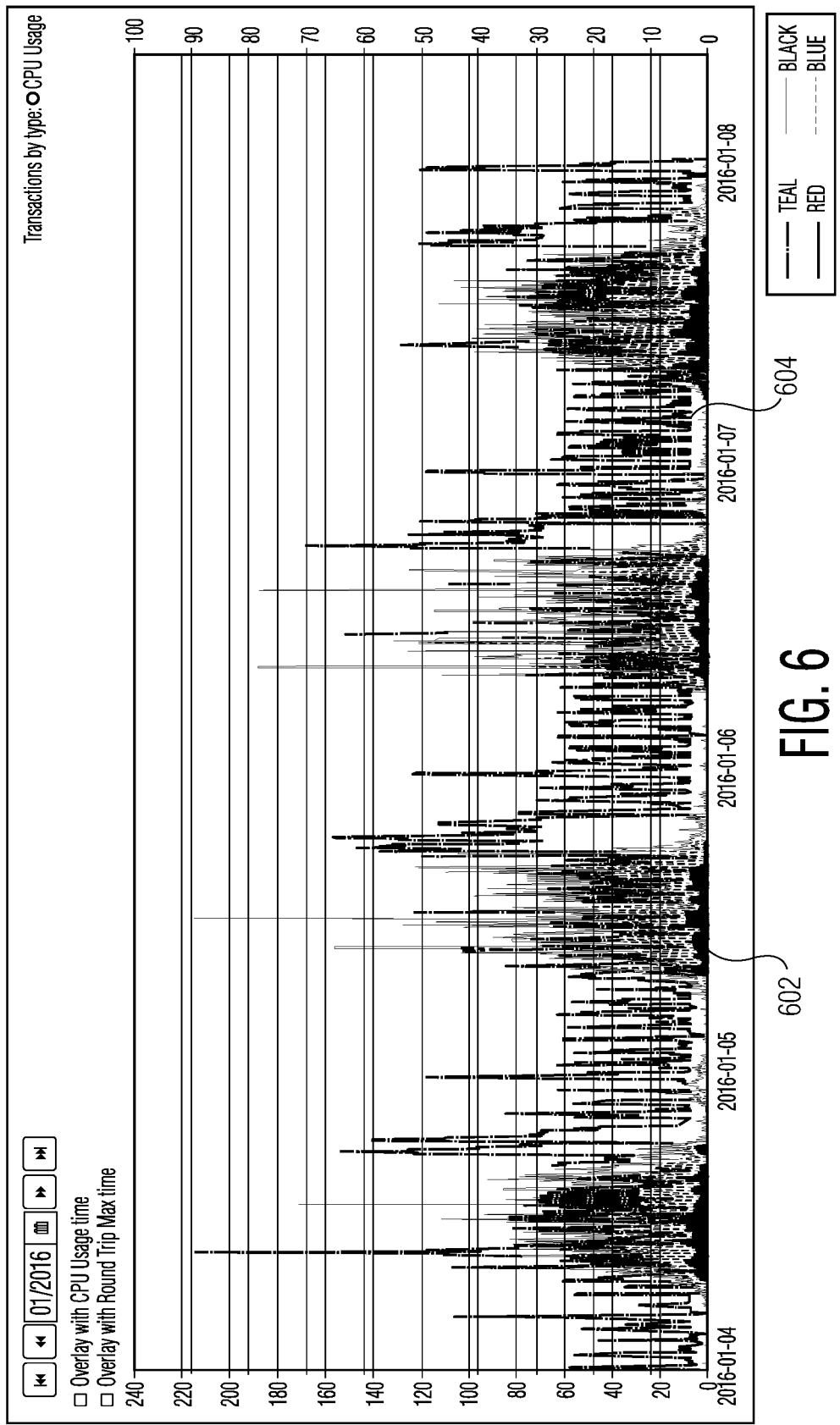
FIG. 6 is a graphical representation of overlaid plots of transactions over a given time period and corresponding CPU usage, according to an exemplary embodiment.
Figure 7:
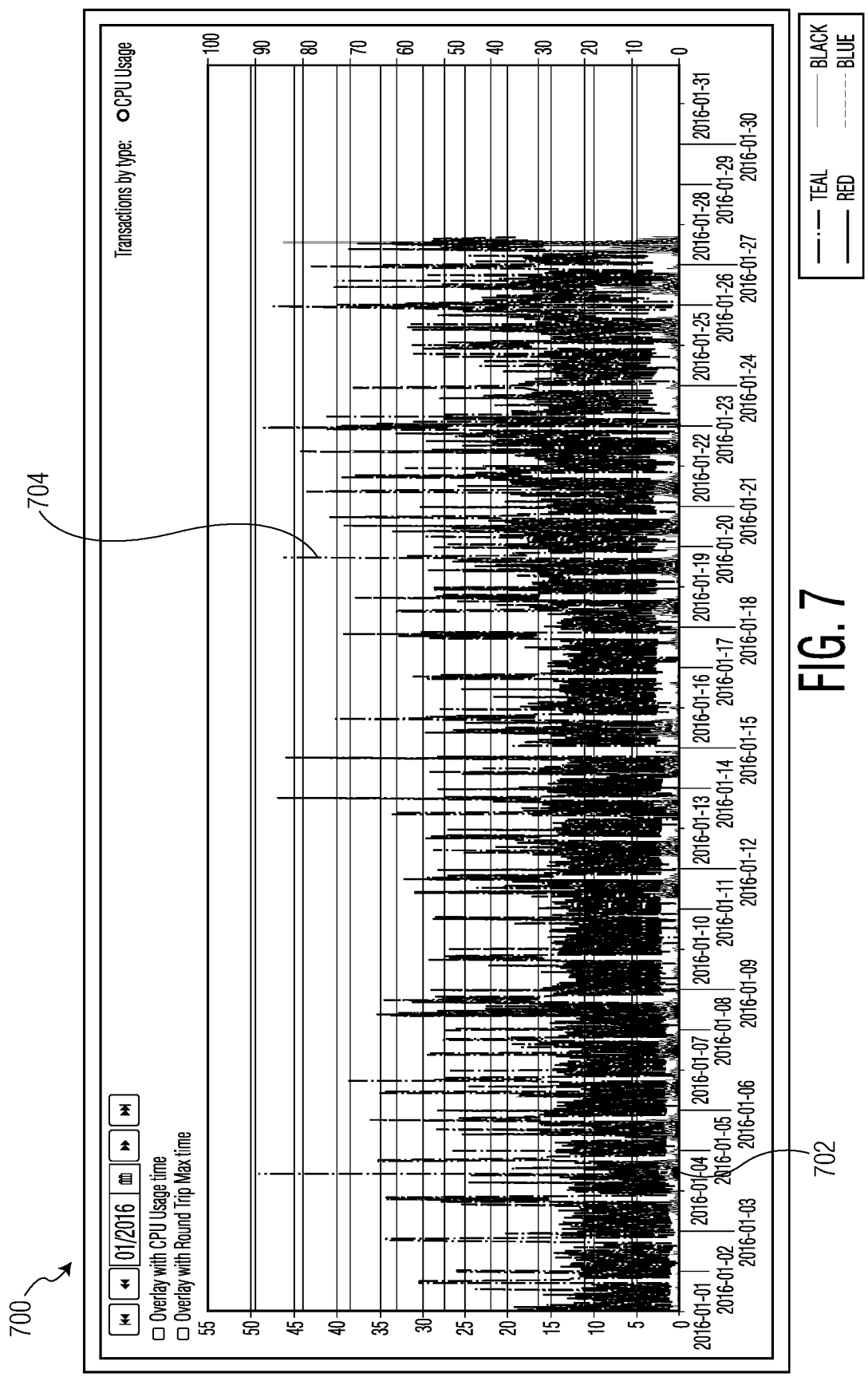
FIG. 7 is a graphical representation of overlaid plots of transactions over a given time period and corresponding CPU usage, according to another exemplary embodiment.

Information from heat maps, for example as shown in FIGS. 4 and 5 are then overlaid with information regarding the consumption of the computing resources during the same time periods to quantify the provisioning requests. FIG. 6 is a graphical visualization 600 of a plot of hourly number of transactions during a five day period imposed upon a plot of corresponding CPU usage, according to an exemplary embodiment. Different sections may be marked in visually distinct manners. For example, some overlaid charts may be one color, versus another overlay which uses a different color. This visualization supports the identification of peak usage periods and can help drill down the type of computing resources required to support different types of heavy usage periods, for example as indicated as "red" regions 602 is drawn using a solid black line, or during light usage periods, for example as indicated as "teal" regions 604 is drawn using a semi-dashed line as figured in the key. FIG. 7 is a graphical visualization 700 of a plot of the hourly number of transactions during a month imposed upon a plot of the corresponding CPU usage, according to an exemplary embodiment. This visualization supports the identification of peak usage periods and may help drill down the type of computing resources required to support different types of heavy usage periods, for example as indicated as "red" regions 602 is drawn using a solid black line, or during light usage periods, for example as indicated as "teal" regions 604 is drawn using a semi-dashed line as figured in the key. These two graphical representations in FIGS. 6 and 7 are visualizations of combining monitoring data (for example, CPU Usage) with different types of actual on-line activity (for example, transactions, queries, drills) for a week and month. These combinations in conjunction with actual response times are used to determine provisioning requests.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular. The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
receiving, by a server of a dynamic provisioning system, from a client device, a selection of an enterprise application for an enterprise resource planning system, wherein the selection is stored as a first plurality of records in a resource management database;
determining, by the server of the dynamic provisioning system, an infrastructure configuration and an enterprise application configuration for the enterprise application responsive to the selection;
sending, by the server of the dynamic provisioning system, instructions for provisioning the enterprise application to a data center based on the infrastructure configuration and the enterprise application configuration;
causing, by the server of the dynamic provisioning system, an allocation of a set of computing resources at the data center based on the instructions sourcing the infrastructure configuration and the enterprise application configuration for access by the client device;
receiving, by the server of the dynamic provisioning system, after the allocation, metadata associated with transactions in the enterprise resource planning system and real-time consumption information from the enterprise resource planning system containing the infrastructure configuration and the enterprise application configuration, wherein the real-time consumption information includes real-time CPU usage data and an online transaction activity and is stored as a second plurality of records in the resource management database;
determining, by the server of the dynamic provisioning system, a provisioning threshold associated with the infrastructure configuration and the enterprise application configuration and stored as a third plurality of records in the resource management database, wherein the provisioning threshold includes a predefined number of the online transaction activity in combination with the real-time CPU usage data and is based on the metadata associated with transactions in the enterprise resource planning system;
determining, by the server of the dynamic provisioning system, that the infrastructure configuration and the enterprise application configuration needs to be modified in response to two or more of the third plurality of records satisfying a preset relationship to two or more of the second plurality of records;
dynamically adjusting, by the server of the dynamic provisioning system, the set of computing resources of the data center in a modified infrastructure configuration relative to the infrastructure configuration and a modified enterprise application configuration relative to the enterprise application configuration for the enterprise application based on actual data coming from inside the enterprise application and responsive to the preset relationship being satisfied; and
deploying, by the server of the dynamic provisioning system, the modified infrastructure configuration and the modified enterprise application configuration for access by the client device while the predefined number of the online transaction activity in combination with the real-time CPU usage data exceeds the provisioning threshold.

2. The method of claim 1, wherein the predefined number of the online transaction activity in combination with the CPU usage data is determined by analyzing historical data associated with the infrastructure configuration and the enterprise application configuration.

3. The method of claim 1, wherein the predefined number of the online transaction activity in combination with the CPU usage data is determined by analyzing real-time data associated with the infrastructure configuration and the enterprise application configuration.

4. The method of claim 1, wherein the predefined number of the online transaction activity comprises commit count, average downtimes, maximum downtimes, and application response times.

5. The method of claim 1, wherein the real-time CPU usage data comprises one or more of system CPU usage metric, application CPU usage metric, amount of memory utilized, amount of available memory, and availability of infrastructure components.

6. A system comprising:
a resource management database;
a processor communicatively coupled to the resource management database; and
a non-transitory computer-readable medium positioned in communication with the processor and having a computer program stored thereon including a set of instructions that when executed by the processor cause the processor to perform operations of:
receiving, from a client device, a selection of an enterprise application for an enterprise resource planning system, wherein the selection is stored as a first plurality of records in a resource management database;
determining an infrastructure configuration and an enterprise application configuration for the enterprise application responsive to the selection;
sending instructions for provisioning the enterprise application to a data center based on the infrastructure configuration and the enterprise application configuration;
causing an allocation of a set of computing resources at the data center based on the instructions sourcing the infrastructure configuration and the enterprise application configuration for access by the client device;
receiving, after the allocation, metadata associated with transactions in the enterprise resource planning system and real-time consumption information from the enterprise resource planning system containing the infrastructure configuration and the enterprise application configuration, wherein the real-time consumption information includes real-time CPU usage data and an online transaction activity and is stored as a second plurality of records in the resource management database;
determining a provisioning threshold associated with the infrastructure configuration and the enterprise application configuration and stored as a third plurality of records in the resource management database, wherein the provisioning threshold includes a predefined number of the online transaction activity in combination with the real-time CPU usage data and is based on the metadata associated with transactions in the enterprise resource planning system;
determining that the infrastructure configuration and the enterprise application configuration needs to be modified in response to two or more of the third plurality of records satisfying a preset relationship to two or more of the second plurality of records;
dynamically adjusting the set of computing resources of the data center in a modified infrastructure configuration relative to the infrastructure configuration and a modified enterprise application configuration relative to the enterprise application configuration for the enterprise application based on actual data coming from inside the enterprise application and responsive to the preset relationship being satisfied; and
deploying the modified infrastructure configuration and the modified enterprise application configuration for access by the client device while the predefined number of the online transaction activity in combination with the real-time CPU usage data exceeds the provisioning threshold.

7. The system of claim 6, wherein the predefined number of the online transaction activity in combination with the CPU usage data is determined by analyzing historical data associated with the infrastructure configuration and the enterprise application configuration.

8. The system of claim 6, wherein the predefined number of the online transaction activity in combination with the CPU usage data is determined by analyzing real-time data associated with the infrastructure configuration and the enterprise application configuration.

9. The system of claim 6, wherein the predefined number of the online transaction activity comprises commit count, average downtimes, maximum downtimes, and application response times.

10. The system of claim 6, wherein the real-time CPU usage data comprises one or more of system CPU usage metric, application CPU usage metric, amount of memory utilized, amount of available memory, and availability of infrastructure components.

11. A non-transitory computer readable storage device, storing program instructions that when executed cause a server to perform a method, the method comprising:
receiving, from a client device, a selection of an enterprise application for an enterprise resource planning system, wherein the selection is stored as a first plurality of records in a resource management database;
determining an infrastructure configuration and an enterprise application configuration for the enterprise application responsive to the selection;
sending instructions for provisioning the enterprise application to a data center based on the infrastructure configuration and the enterprise application configuration;
causing an allocation of a set of computing resources at the data center based on the infrastructure configuration and the enterprise application configuration for access by the client device;
receiving, after the allocation, metadata associated with transactions in the enterprise resource planning system and real-time consumption information from the enterprise resource planning system containing the infrastructure configuration and the enterprise application configuration, wherein the real-time consumption information includes real-time CPU usage data and an online transaction activity and is stored as a second plurality of records in the resource management database;

determining a provisioning threshold associated with the infrastructure configuration and the enterprise application configuration and stored as a third plurality of records in the resource management database, wherein the provisioning threshold includes a predefined number of the online transaction activity in combination with the real-time CPU usage data and is based on the metadata associated with transactions in the enterprise resource planning system;

determining that the infrastructure configuration and the enterprise application configuration needs to be modified in response to two or more of the third plurality of records satisfying a preset relationship to two or more of the second plurality of records;

dynamically adjusting the set of computing resources at the data center in a modified infrastructure configuration relative to the infrastructure configuration and a modified enterprise application configuration relative to the enterprise application configuration for the enterprise application based on actual data coming from inside the enterprise application and responsive to the preset relationship being satisfied; and deploying the modified infrastructure configuration and the modified enterprise application configuration for access by the client device while the predefined number of the online transaction activity in combination with the real-time CPU usage data exceeds the provisioning threshold.

12. The non-transitory computer readable storage device of claim 11, wherein the predefined number of the online transaction activity in combination with the CPU usage data is determined by analyzing historical data associated with the infrastructure configuration and the enterprise application configuration.

13. The non-transitory computer readable storage device of claim 11, wherein the predefined number of the online transaction activity in combination with the CPU usage data is determined by analyzing real-time data associated with the infrastructure configuration and the enterprise application configuration.

14. The non-transitory computer readable storage device of claim 11, wherein the predefined number of the online transaction activity comprises commit count, average downtimes, maximum downtimes, and application response times.

15. The non-transitory computer readable storage device of claim 11, wherein the real-time CPU usage data comprises one or more of system CPU usage metric, application CPU usage metric, amount of memory utilized, amount of available memory, and availability of infrastructure components.

* * * * *